United States Patent
Greenspan et al.

(10) Patent No.: US 9,514,047 B2
(45) Date of Patent: Dec. 6, 2016

(54) APPARATUS AND METHOD TO DYNAMICALLY EXPAND ASSOCIATIVITY OF A CACHE MEMORY

(71) Applicant: Intel Corporation, Santa Clara, CA (US)

(72) Inventors: Daniel Greenspan, Jerusalem (IL); Yoav Lossin, Jerusalem (IL); Blaise Fanning, Folsom, CA (US); Nagi Aboulenein, King City, OR (US); Marc Torrant, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 139 days.

(21) Appl. No.: 14/573,811

(22) Filed: Dec. 17, 2014

(65) Prior Publication Data
US 2016/0179666 A1    Jun. 23, 2016

(51) Int. Cl.
*G06F 12/00* (2006.01)
*G06F 12/08* (2016.01)

(52) U.S. Cl.
CPC ..... *G06F 12/082* (2013.01); *G06F 2212/1021* (2013.01); *G06F 2212/608* (2013.01)

(58) Field of Classification Search
CPC .............. G06F 12/082; G06F 2212/608; G06F 2212/1023
See application file for complete search history.

(56) References Cited

U.S. PATENT DOCUMENTS 9,355,038 B2 *   5/2016   Patsilaras ............ G06F 12/0893
2010/0312850 A1 * 12/2010  Deshpande ......... G06F 12/1009
                                                            709/216

* cited by examiner

*Primary Examiner* — John A Lane
(74) *Attorney, Agent, or Firm* — Trop, Pruner & Hu, P.C.

(57) ABSTRACT

In an embodiment, a processor includes at least one core, a cache memory, and a cache controller. Responsive to a request to store an address of a data entry into the cache memory, the cache controller is to determine whether an initial cache set of the cache memory and corresponding to the address has available capacity to store the address. Responsive to unavailability of capacity in the initial cache set, the cache controller is to generate a first alternate address associated with the data entry and to determine whether a first cache set corresponding to the first alternate address has available capacity to store the alternate address and if so to store the first alternate address in the first cache set. Other embodiments are described and claimed.

20 Claims, 7 Drawing Sheets

APPARATUS AND METHOD TO DYNAMICALLY EXPAND ASSOCIATIVITY OF A CACHE MEMORY

TECHNICAL FIELD

The field is associativity of a cache memory.

BACKGROUND

Some devices that access stored data (e.g., a display controller that accesses data within a computing device) may have a low tolerance for latency associated with access of the data from a main memory. Consequently, such a device may require that a significant proportion of a cache memory be allocated for use by the device.

Due at least in part to virtualization techniques and operating system behavior, the main memory allocated to the device may not be contiguous, but may be formed from tens of thousands, or even hundreds of thousands of small memory pages, each at an arbitrary location in main memory. Due to the low latency requirements of the device that accesses the data, virtually all of these memory pages may need to be locked into the cache.

In order to be able to lock in every statistically plausible combination of memory page addresses, cache associativity may be many times higher than an average number of ways used by the device. For example, if the cache is 16-way set associative and 50% of the cache memory is assigned to arbitrary pages allocated to a device, the average number of ways assigned to the device will be 8. Yet for some sets, greater than the 16 total available ways will be required.

DETAILED DESCRIPTION

Figure 1:
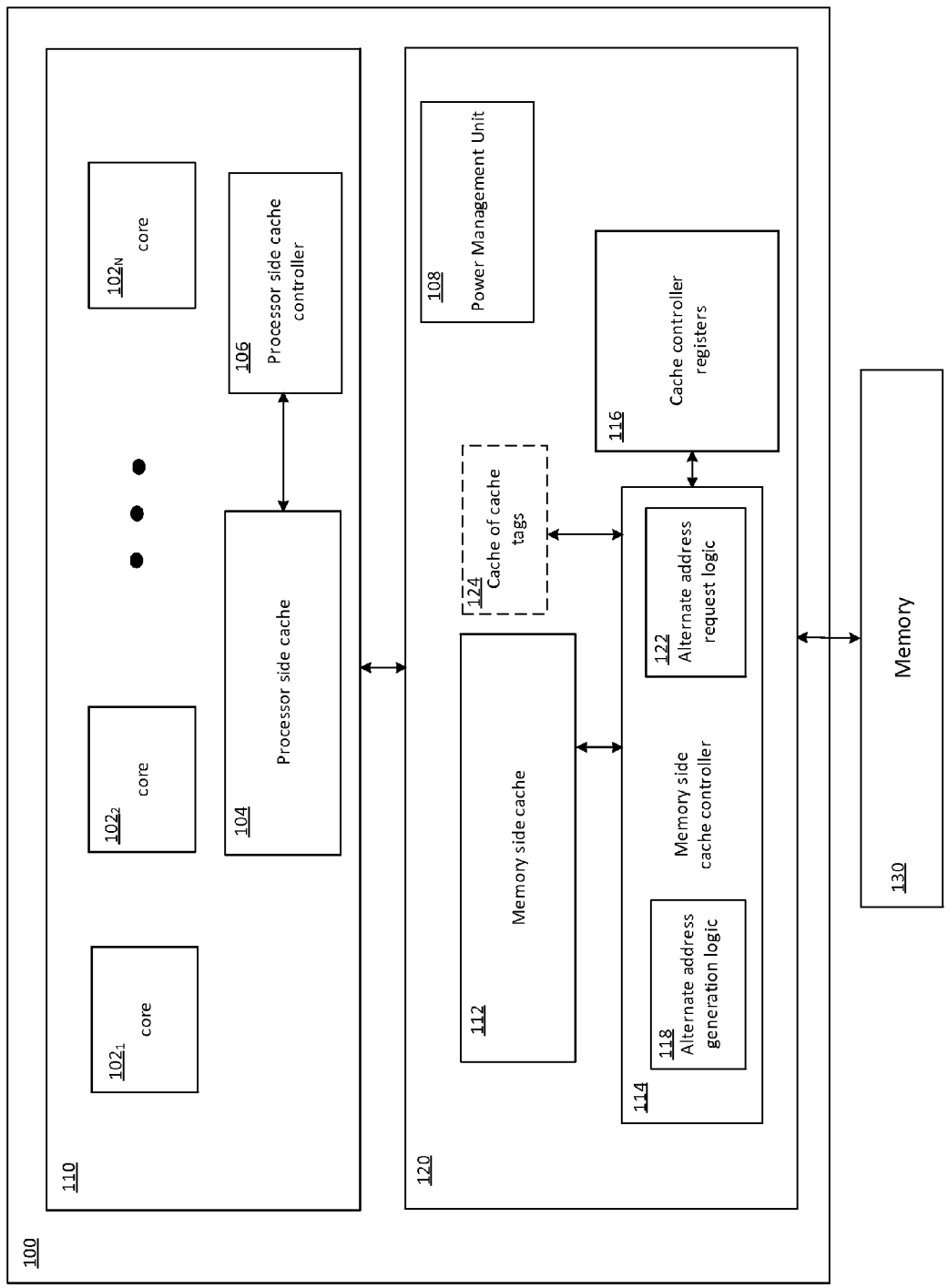
FIG. 1 is a block diagram of a system, according to an embodiment of the present invention.

In embodiments, alternate address generation logic may generate alternate addresses for storage of an entry (e.g., memory page or portion thereof) that is to be stored in a cache. One of the alternate addresses may be used when it is not possible to lock a native address of the entry in the cache. When data is stored at an alternate address of the cache, the alternate address may be within a cache set that differs from the cache set that the native address would occupy, thus effectively increasing the associativity of the cache.

A "flag and lamp" mechanism may be used to limit effort expended in searching for alternate addresses when a cache lookup is performed.

In some embodiments, a "cache of cache tags" may be added to store tags for most recently used cache entries, regardless of whether the cache entries were found at alternate addresses. The cache of cache tags may be configured such that for stored memory addresses, the set that includes the alternate address used is identified, and may shorten a lookup search.

One technique that may be employed to produce alternate addresses is "address spreading," which allows memory addresses such as a 36-bit platform physical address (also original PPA herein) to be re-targeted to alternative sets in the cache. In an embodiment, address spreading may increase an address space by a factor of 16 through addition of four upper address bits to create an expanded address, e.g., bits [39:0], and may create, for each original PPA, a set of 16 addresses that alias to each other.

In some embodiments, alternate addresses ("spread addresses") may be created by execution of an XOR operation on a 4-bit value S (e.g., spread value) into bits [25:22] of the original PPA and placement of the spread value S into bits [39:36] of the expanded address. The spread address with S=0 (referred to herein as the "native address") is numerically equivalent to the original PPA. The remaining spread addresses (e.g., aliased addresses) may be created by choosing $1 \leq S \leq 15$ ("alternate addresses" herein). In embodiments, for any group of addresses created with this address creation technique, the addresses in the group of addresses alias only to each other, e.g., if X is data written into a spread address for a particular original PPA, no other PPA address or its alternate addresses can be read to determine the value of X.

In some embodiments, only one of the spread addresses is permitted to be held in the cache at any time (a momentary exception may occur due to the request to lock or unlock, for which a cache entry is transitioned between different alternate addresses, typically from S=0 to S>0 spread). Any address received by the cache, or propagated during a cache miss, may be converted to the original PPA (e.g., formed by setting S=0 and removing bits [39:36]).

Spread addresses, by virtue of their differing bits [25:22], may map into different associative sets of a cache that use bits [25:22] of the address to create a set index number. In an embodiment where multiple caches are being used to distribute the workload, the set spread addresses may all map to the same cache.

FIG. 1 is a block diagram of a system, according to embodiments of the present invention. The system includes a processor 100 coupled to a memory 130, e.g., dynamic random access memory (DRAM). The processor 100 includes a core portion 110 that includes one or more cores $102_1, 102_2, \ldots 102_N$, and may also include a processor side cache memory 104 and a processor side cache controller 106. The processor 100 also includes an uncore portion 120 that may include a power management unit 108, a memory side cache 112, a memory side cache controller 114 that may include alternate address generation logic 118, alternate address request logic 122, and cache controller registers 116. Optionally, the uncore portion 120 may include a cache of cache tags 124. In operation, the memory side cache controller 114 may receive an indication (e.g., a lock request received from a core as a result of execution of software) that an address corresponding to an original PPA in memory 130 is to be locked in the memory side cache 112. (In an embodiment, the indication may be stored within the cache controller registers 116.) The cache controller 114 may attempt to store a data entry into the memory side cache 112 using an equivalent native address (e.g., formed by appending four bits, each of which has a value of zero, to address positions [39:36]) of the memory side cache 112 that corresponds to the original PPA in memory 130. If the attempt to lock the data entry into the native address of the memory side cache 112 is successful (e.g., success occurs when a cache set associated with the native address is not already maximally locked, and thus the native address may be locked in this set), the task is complete.

However, if the cache set that would include the native address is already fully locked, the alternate address generation logic 118 may generate one or more alternate addresses to be associated with the data entry. In one embodiment, the alternate address generation logic 118 may append non-zero spread bits (S) to the native address and perform an operation, e.g., XOR of the spread bits with selected bits of the native address. The selected bits in the native address may be replaced with an outcome of the XOR operation to produce each alternate address. Each alternate address may be generated by incrementing the value of S, appending the incremented S to the original PPA, performance of the operation (e.g., XOR) of S with designated bits of the original PPA, and replacement of the designated bits of the original PPA with the outcome of the operation, to create the alternate address that is to be presented to the memory side cache 112. Thus, the alternate address generation logic 118 may generate a plurality of successive alternative addresses, each successive alternate address to be determined based upon an incremented value of S.

The cache controller 114 may attempt to store the data entry using an alternate address. If unsuccessful at a particular alternate address (e.g., the set that would include the alternate address is fully locked), storage using the next successive alternate address may be attempted. If none of the alternate addresses is available to receive the data entry, a lock failure may be indicated responsive to the lock request.

Figure 2:
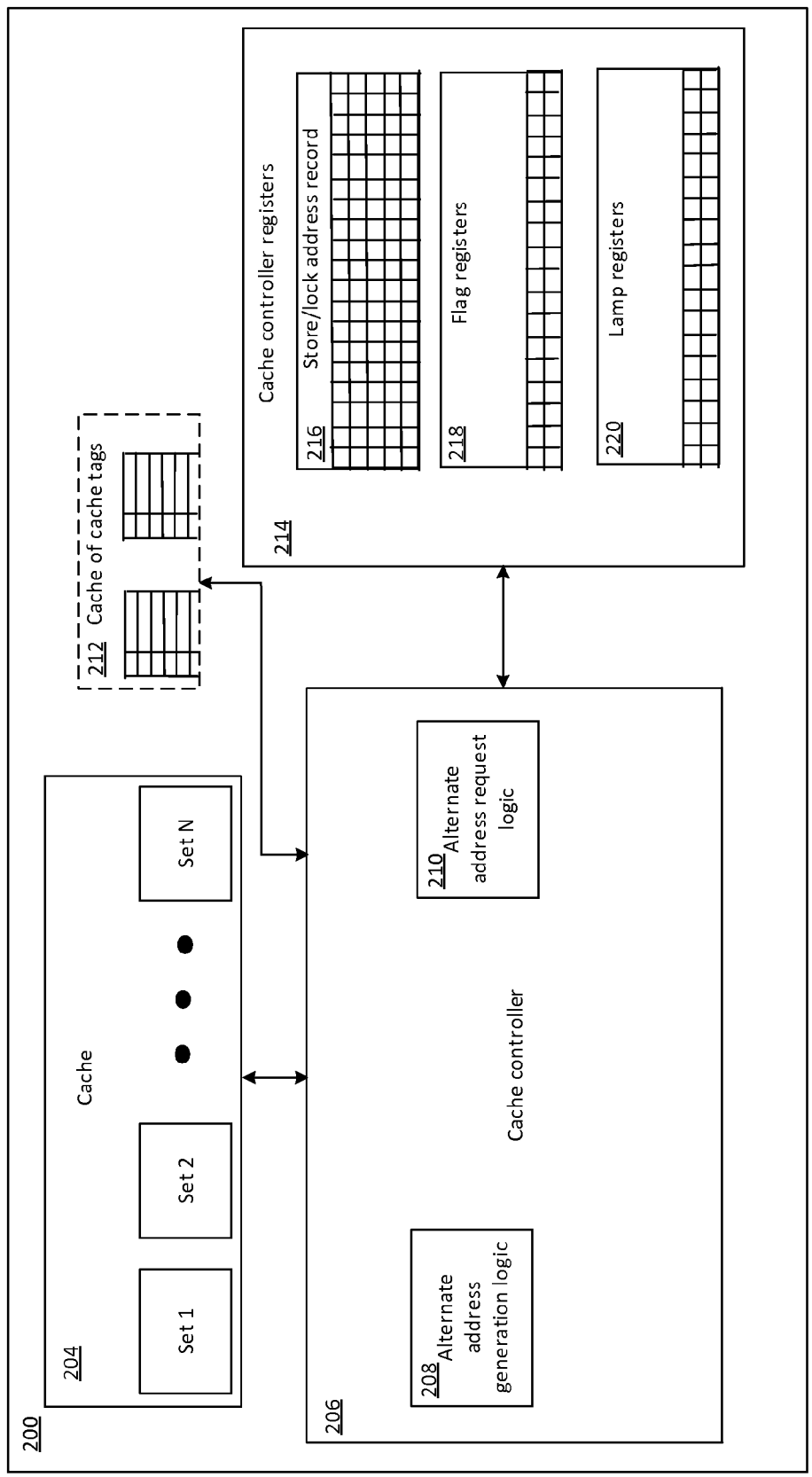
FIG. 2 is a block diagram of an apparatus, according to an embodiment of the present invention.

The cache control registers 116 may also include flag registers (not shown) and lamp registers (not shown), to be discussed further with reference to FIG. 2. Each flag entry may be associated with a set that would have included one or more native addresses at which an attempt to store and lock a particular data entry failed, or for which the particular data entry is currently allocated in an alternate address. Each lamp entry may be associated with a set for which a data entry is stored according to an alternate (e.g., non-native) address.

Upon a request (e.g., by a core $102_i$) to access a particular data entry in the memory side cache 112, the particular data entry having an original PPA, if the particular data entry is not found at the native address formed by appending S=0 as bits [39:36], the alternate address request logic 122 may request that one or more alternate addresses be generated by the alternate address generation logic 118, and the cache controller 114 may attempt to locate the data entry using each successive alternate address until successful location of the particular data entry. If no success occurs, a cache miss may be indicated.

In an embodiment, the cache of cache tags 124 may store, for each successfully stored data entry and locked address, a corresponding cache tag and a spread value that may be used to determine the alternate address of the stored data entry, and optionally may store other cache related data. In an embodiment, the cache of cache tags 124 may store, for each locked address in the memory side cache 112, an original PPA and a corresponding S value with which to create the locked alternate address. The entries in the cache of cache tags 124 may serve to shorten a subsequent search for the data entry.

The discussion above depicts locking/storage of data at the memory side cache 112 by the memory side cache controller 114. Similar techniques to those presented above may be utilized to store/lock an address and data, and retrieve the data at the processor side cache 104, by the processor side cache controller 106.

FIG. 2 is a block diagram of an apparatus, according to an embodiment of the present invention. The apparatus 200 includes a cache 204, a cache controller 206, cache controller registers 214, and optionally, a cache of cache tags 212. The cache controller 206 may include alternate address generation logic 208 and alternate address request logic 210. The cache controller registers 214 may include store/lock address record 216, flag registers 218, and lamp registers 220.

In operation, for a data entry that is to be stored and locked in the memory side cache 204 (e.g., responsive to a request from an operating system), upon locking the address in the memory side cache 204, an indicator associated with the data entry of an original PPA associated with the data entry may be stored in the store/lock address record 216. If the cache controller 206 is successful at storage and locking the data entry into the memory side cache 204 at the native address formed from the original PPA, the cache controller 206, no flag indicators ("flags") or lamp indicator ("lamps") will be asserted (e.g., stored) in the cache controller registers 214.

If the cache controller 206 determines that a set of addresses that would include the native address in the cache 204 is fully occupied and unavailable for storage of the data entry, the alternate address generation logic 208 is to generate an alternate address. Each of the alternate addresses may map to a distinct cache set (e.g., each alternate address is in a distinct one of the sets 1, 2, . . . N), e.g., none of the alternate addresses is in a set that includes another of the alternate addresses associated with the original PPA. Additionally, a flag associated with a set that was unavailable to store the native address may be stored (e.g., asserted) in the flag registers 218. The stored flag may indicate that the set nominally includes at least one native address for which one or more alternate addresses (alias addresses) have been created in order to store the data entry. It is to be noted that flags may be stored (asserted) and/or removed (de-asserted) as address locking history evolves.

If the cache controller 206 is successful in storage and locking of the data entry using one of the alternate addresses, a lamp (associated with the set containing the alternate address that stores the data entry) may be asserted in the lamp register 220.

The cache of cache tags 212 may store a cache tag (e.g., portion of the PPA address) and a spread value S of each alternative cache address that stores a corresponding data entry. Additionally, the cache of cache tags 212 may store other information such as cache validity, cache way used, and "dirtiness" of each stored data entry, which may prove to be useful information upon access of the data entry. In an embodiment, entries in the cache of cache tags 212 may be grouped according to their original PPA address even if the entries were stored under an alternate address formed with S>0. A look-up in the cache of cache tags 212 may return a corresponding value of S, which may allow the alternate address to be directly calculated.

Upon request for retrieval of the data entry, the cache controller 206 may determine whether the data entry is stored at the native address of the data entry, and if so, the cache controller 206 is to retrieve the data entry and is to provide the retrieved data entry to a requester, e.g., a core that has requested the data entry.

If the cache controller 206 determines that the data entry is not stored in the memory side cache 204 at the native address of the data entry, the alternate address request logic 210 may issue a request to the alternate address generation logic 208 to generate alternate addresses based on the native PPA. The cache controller 206 may attempt to locate the data entry at successive alternate addresses. If a flag is asserted in the flag registers 218, e.g., the flag associated with a set that nominally includes the native address, then a search through the alternate addresses is indicated. If the flag of the set of the native address is not asserted in the flag register 218, a further search may be assured of failure, e.g., a cache miss, and may thus be avoided. Further, if a set of addresses within the cache does not have a corresponding lit lamp (e.g., stored lamp indicator), that set is not expected to contain any alternate addresses and that set need not be included in the search. Thus, the flags and lamps stored in the cache controller registers 214 may help to narrow a scope of a search for stored/locked data entries.

In another embodiment, the alternate address request logic 210 may generate the alternate addresses for storage of a data entry, and the alternate address generation logic 208 may be used to search for a particular data entry.

Figure 3:
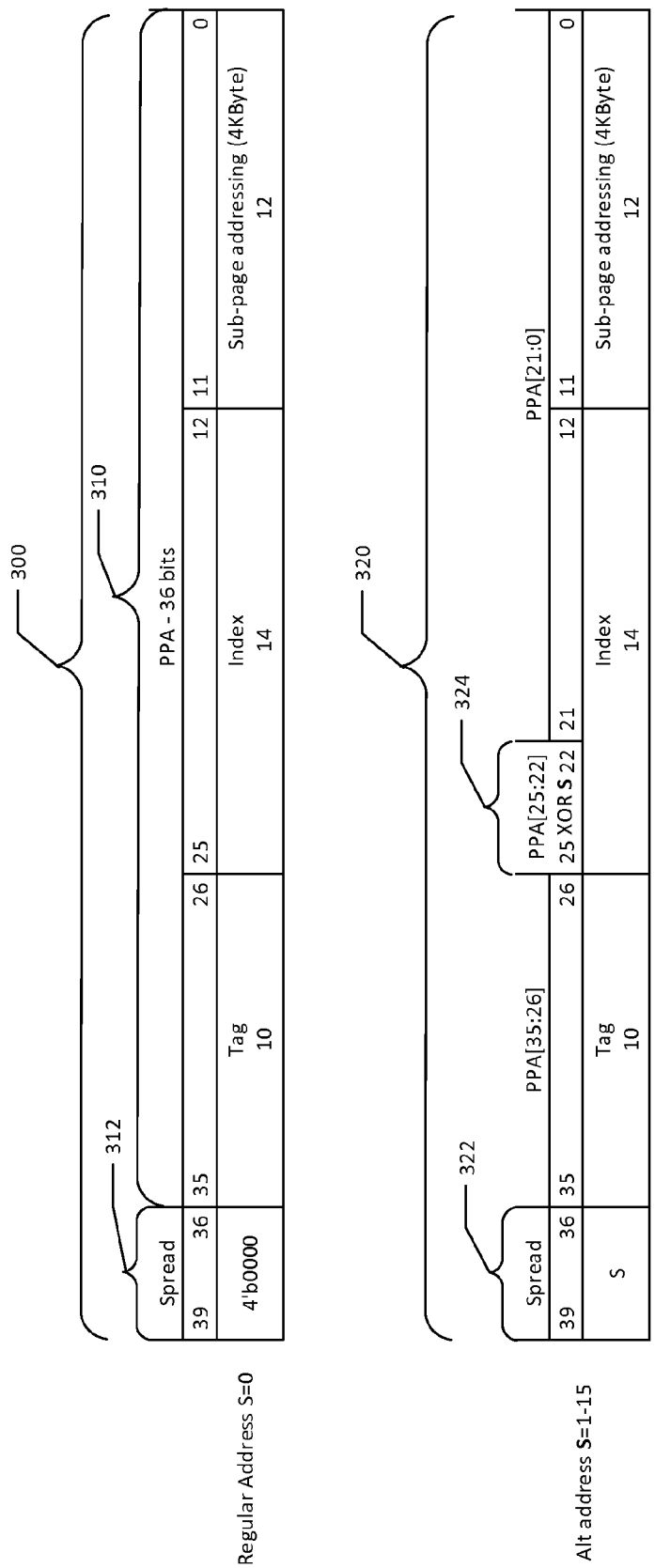
FIG. 3 is a block diagram that depicts formation of an alternate address, according to an embodiment of the present invention.

FIG. 3 is a block diagram that depicts formation of an alternate address, according to an embodiment of the present invention. Native address 300 (e.g., a 40-bit address is shown) may be created from an original PPA 310 of 36 bits [35:0]. Four "spread" bits (e.g., a binary equivalent of an integer S) may be appended at [39:36] to form the native address. For a case S=0 (native address 300) the stored binary value is 0000.

Non-zero values of S may be used to form one or more alternate addresses, each of which is unique and each of which is included in a distinct cache set that is different from the cache set that contains the native address. For example, an alternate address 320 may be created that includes the spread bits [39:36], which have a binary equivalent of one of S=1-15. Bits [21:0] and [35:26] may remain unchanged from the original PPA 310 and the native address 300. Alternate address bits [25:22] may be determined by performing an operation (e.g., XOR), with the operands being bits [25:22] of original PPA 310, and the spread bits 322. In other embodiments, other operations may be used to create alternate addresses (e.g., addition, modular addition, subtraction, modular subtraction, modular multiplication, etc.).

In still other embodiments, other initial data sizes may be used, e.g., 40 bit, etc. and the native and alternate addresses may have more bits, e.g., 44 bit.

The resultant alternate address 320 may be used in an attempt to store and lock a data entry responsive to a request to store/lock the data entry, or to retrieve a stored and locked data entry responsive to a request to access the data entry. Thus, use of spread bits 322 may enable creation of up to 15 alternate addresses that alias to the native address 310. In embodiments, the alternate addresses and the native address 300 are alternate representations of the original PPA 310.

Figure 4:
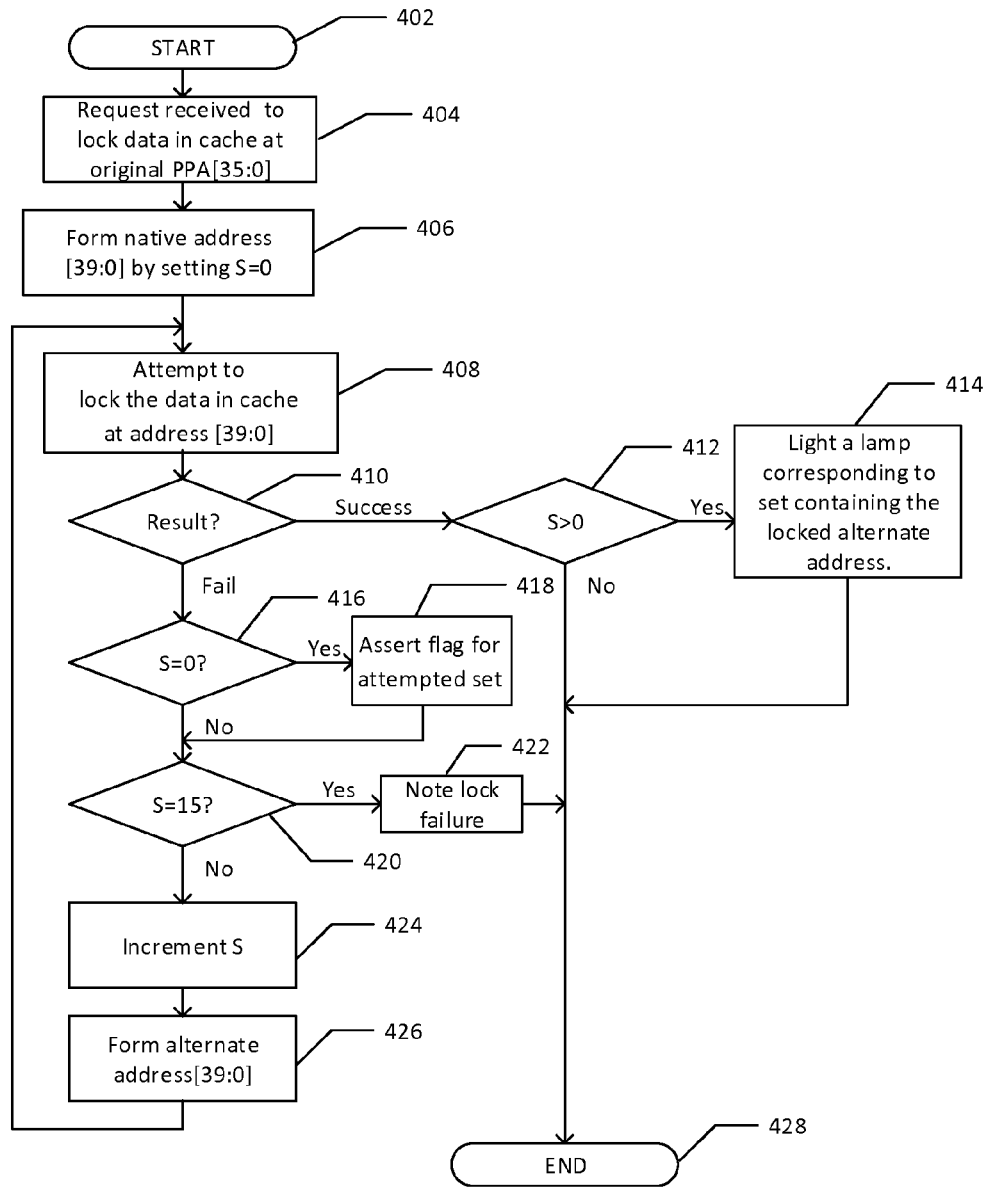
FIG. 4 is a flow diagram of a method, according to an embodiment of the present invention.

FIG. 4 is a flow diagram of a method, according to an embodiment of the present invention. A system of per-set flag indicators and per-set lamp indicators may be used to track sets that nominally include a native address, and also sets that contain an alternate (e.g., aliased) address. Flag indicators and lamp indicators may have no impact on storage and locking of data in a cache, but may be used during cache access. Note that lamps may automatically light and extinguish, and flags may be de-asserted when no relevant lamps are lit, and also in cases where, during a lookup process, a particular flag is deemed to be stale.

Method 400 starts at block 402. Continuing to block 404, a cache controller receives a request to lock data at an original PPA (e.g., 36-bit PPA, [35:0]) into a cache. (In other embodiments the native address may have more than 36 bits or less than 36 bits). Advancing to block 406, the cache controller expands the original PPA to an expanded address (40 bits) by appending 4 spread bits (S=0) to the 36-bit original PPA, to create the native address.

Moving to block 408, the cache controller attempts to lock the data into the cache at the native address. Proceeding to decision diamond 410, if the cache controller successfully locks the data in the cache at the native address, continuing to decision diamond 412, since S=0 the method advances to block 428 where the method ends.

If, at decision diamond 410, the cache controller fails to store/lock the data into the cache at the native address (e.g., formed using S=0), continuing to decision diamond 416, since S=0, advancing to block 418 a flag is asserted, e.g., a flag indicator is changed from a first value to a second value. The flag associated with a cache set associated with the native address at which the storage/lock of the native address and data was attempted.

Moving to decision diamond 420, if S is equal to 15 (e.g., as a result of iterations through block 424, 426, 408, 410, and 416), proceeding to block 422 a lock failure is noted and the method ends at block 428. If, at decision diamond 420, S is less than 15, proceeding to block 424 the cache controller increments S, and continuing to block 426, an alternate address is formed, e.g., by XOR operation of bits [25:22] with the binary value of S, e.g., [39:36]. (Alternatively, another alternate address determination scheme may be used to determine the alternate address.) Returning to block 408, the cache controller attempts to lock the data into the cache at the alternate address. Attempts to lock alternate addresses (0<S≤15) continue until a successful storage/lock of the data into one of the alternate addresses or until all values of S have been attempted.

If, at decision diamond 410, the cache controller successfully locks the data into one of the alternate addresses, continuing to decision diamond 412, since S>0 for all alternate addresses, advancing to block 414 the cache controller asserts a lamp (e.g., changes a lamp indicator from a first lamp value to a second lamp value in a lamp register) that corresponds to a set in which the alternate address was successfully stored/locked. The method ends at block 428.

Thus, data that has been stored and locked in a cache may be located through generation of alternate addresses, and flag and lamp information stored in registers accessible by the cache controller may serve to reduce search efforts.

Due to a limit on a number of cache ways per set that may be locked in a particular cache implementation, there may be cases where a system-generated request to store/lock data into an address cannot be granted by the cache. The flow chart of FIG. 4 illustrates how address spreading may be employed in these cases to provide alternate addresses to the cache to be stored/locked, with an overall result that it is statistically highly probable that a random or arbitrary group of original PPAs of up to half the total cache capacity can be successfully locked through use of a mix of native addresses and spread addresses.

When the system asks to access data at an original PPA, it is not known in advance whether the native address is present in the cache or not, and if it is present in the cache, whether the native address has been locked or not, or whether it has been stored using an alternate spread address. Only the PPA may be specified to perform a lookup.

Initially, the cache may be searched using the native address. In many instances where the data is present in the cache, the data may be found at the native address. Some of the sets searched using the native address will have their corresponding flags raised. It may not be known whether the raised flag relates to the address being searched, or to some other address or addresses that are native to the set. If the requested data was not found in the cache at the native address but the flag for the set searched was asserted, the alternate addresses of the original PPA will also be searched. To avoid an unnecessary search of all 15 alternate addresses (particularly in the case where the data was not actually in the cache) the lamps may be consulted each time an alternate address is calculated using a new value of S. When the lamp is not lit, the set associated with the spread address contains no alternate addresses with which some data has been successfully stored/locked, and therefore a search of the cache with that spread address will be fruitless and can be avoided, which may improve performance and power efficiency.

Figure 5:
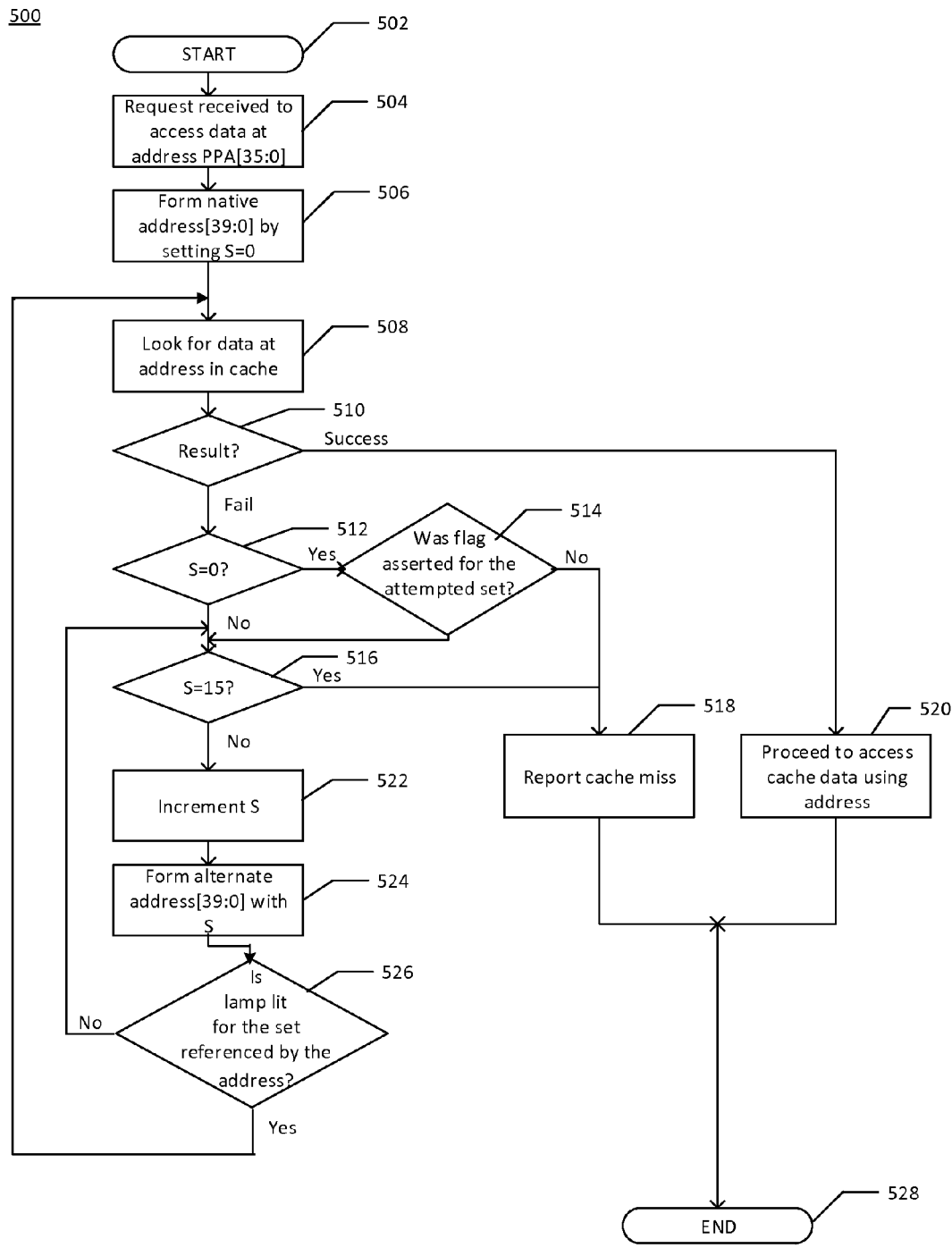
FIG. 5 is a flow diagram of a method, according to another embodiment of the present invention.

FIG. 5 is a flow diagram of a method, according to another embodiment of the present invention. Method 500 starts at block 502. Continuing to block 504, a request may be received by a cache controller to access data associated with an original PPA [35:0]. (In other embodiments, the address to be accessed may have more than 36 bits or less than 36 bits). Advancing to block 506, a native address [39:0] may be generated by the cache controller, e.g., by appending bits (e.g., 4 spread bits that are a binary representation of an integer S=0).

Moving to block 508, the cache controller searches for the native address in the cache. Proceeding to block 510, if the search is successful, advancing to block 520, the cache controller proceeds to access the data stored in the cache using the native address.

Back at decision diamond 510, if the attempt to access the data fails, continuing to decision diamond 512 since S=0 (e.g., for the native address), advancing to block 514 if a flag was asserted that is associated with a set that nominally includes the native address, the search continues. The flag may provide an indication of a (previously attempted) failure to store and lock the data at the native address that may have triggered attempts to store the data at an alternate address, and hence a search of alternate addresses may prove successful, or may indicate that alternate addresses may have been created for another native address that would have been within the same set as the native address. Lack of an asserted flag may indicate that there were not additional attempts to store and lock the data using alternate addresses, and advancing to block 518, the cache controller may report (e.g., upon discovery) a cache miss to a requester (e.g., the requester may then fetch the data from main memory).

If at decision diamond 514 the flag of the set nominally containing the native address is raised, continuing to decision diamond 516, if S<15, advancing to block 522, S is incremented. For example, if the attempt to access the native address fails, then S may be incremented from S=0 to S=1. Moving to block 524, an alternate address may be formed using the incremented value of S (e.g., in one embodiment, the alternate address may be formed as shown in FIG. 3). Proceeding to decision diamond 526, if a lamp associated with a cache set that includes the alternate address is lit, the lit lamp may be interpreted as an indication that an address within the set had data stored and locked (although it is not determinable from the lit lamp whether the data to be accessed is stored and locked within the set), and the search for the data stored and locked in the alternate address continues at block 508. The value of S is incremented at each iteration of the search, and if the search proceeds through S=15 without success, at decision diamond 516, continuing to block 518 a cache miss is reported to the requester. If, at decision diamond 526 the lamp corresponding to the set that may hold the current alternate address is not lit, it may be determined that the current alternate address is not to be found in the cache set that would hold it and is therefore not searched, but instead returning to decision diamond 516, if S is less than 15, the method proceeds to increment S, at block 522. If S=15, at block 518 a cache miss is reported, and the method ends at block 528.

Figure 6:
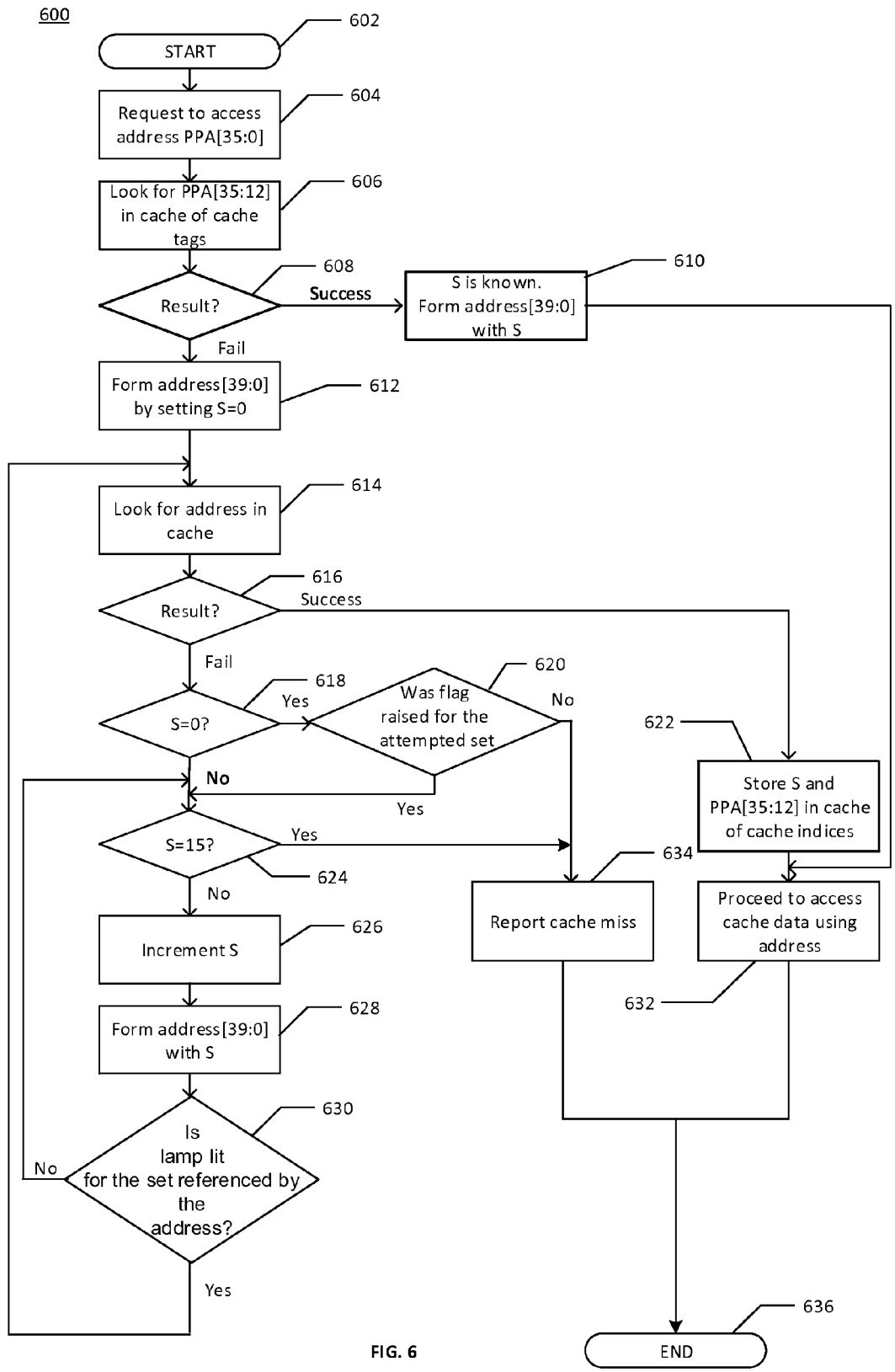
FIG. 6 is a flow diagram of a method, according to another embodiment of the present invention.

FIG. 6 is a flow chart of a method, according to another embodiment of the present invention. Method 600 is similar to the method 500 of FIG. 5, with an addition of a search within a cache of cache tags that may reduce search efforts.

Method 600 begins at block 602. Continuing to block 604, a request may be received e.g., by a cache controller, to access data by accessing an original PPA [35:0]. (In other embodiments, there may be more than 36 bits or less than 36 bits in the original PPA). (For example, the original PPA may include address bits [35:12] and 4K bytes of sub-page address stored at [11:0]. In another example, the original PPA may include address bits [35:6] and 64 bytes of data address granularity is stored [5:0]).

Advancing to block 606, the cache controller may search for original PPA bits, e.g., a portion of the original PPA that include bits from a most significant bit to a cache granularity (e.g., [35:12]) in a cache of cache tags that is accessible to the cache controller. In some embodiments, the cache of cache tags may store an index portion (e.g., [35:12] for 4K data, or [35:06] for 64 bit data) and the S value. In other embodiments, the cache of cache tags may be arranged according to cache sets, and a set number may provide information to recreate some of the address bits without being stored in the cache of cache tags.

Moving to decision diamond 608, if the search within the cache of cache tags is successful, proceeding to block 610 the cache of cache tags returns a corresponding S value, which, with the index portion, may enable determination of an alternate address that stores the data, e.g., the alternate address may be formed from the original PPA [35:0] and the known value of S. For example, the alternate cache address may be determined as shown in FIG. 3. (In other embodiments, the alternate cache address may be formed using another technique to combine S with determined bits of the native PPA.) Continuing to block 632, the cache controller may proceed to access the data using the alternate address determined using the results of the lookup within the cache of cache tags. The method ends at block 636.

If the search within the cache of cache indices fails, advancing to block 612, a native address [39:0] may be generated by the cache controller, e.g., by appending bits (e.g., 4 spread bits that are a binary representation of an integer S=0). Moving to block 614, the cache controller searches for the native address in the cache. Proceeding to decision diamond 616, if the search is successful, advancing to block 622, the value of S and the original PPA address [35:12] is stored in the cache of cache tags, and continuing to block 632, the cache controller proceeds to access data stored in the cache.

If the result at the decision diamond 616 is a failure to locate the data at the native address, and proceeding to decision diamond 618 if S=0 (e.g., the native address), continuing to block 620 if a flag was asserted (e.g., the flag associated with a set to include the native address), the search continues. A lack of an asserted flag may indicate that there were no attempts to store the data at alternate addresses, and advancing to block 634, the cache controller may report a cache miss to a requester (e.g., operating system).

If at decision diamond 620, the flag corresponding to the native address is asserted, continuing to decision diamond 624, if S<15, advancing to block 626, S is incremented. For example, if the attempt to access the data at the native address fails, then S is incremented from S=0 to S=1. Moving to block 628, an alternate address may be formed using the incremented value of S (e.g., in one embodiment, the alternate address may be formed as shown in FIG. 3). Proceeding to decision diamond 630, if a lamp associated with a cache set associated with the alternate address is lit, the lit lamp may be interpreted as an indication that an address within the set had data stored and locked, and the search for the data stored and locked in the alternate address continues at block 614. The value of S is incremented at each iteration of the search, and if the search proceeds through S=15 without success, from decision diamond 624 continuing to block 634, a cache miss is reported to the requester. The method ends at block 636. Thus, use of the cache of cache of cache tags can serve to shorten the search for the data stored in the cache.

The discussion above applies expanded associativity to deal with a request for data to be stored/locked in arbitrary memory locations in a cache memory. A similar approach may be used where there may exist other mechanisms to identify memory locations that are desirable to keep in cache, e.g., by declaration or otherwise identification of memory locations used for direct memory access by a high-speed USB controller.

Figure 7:
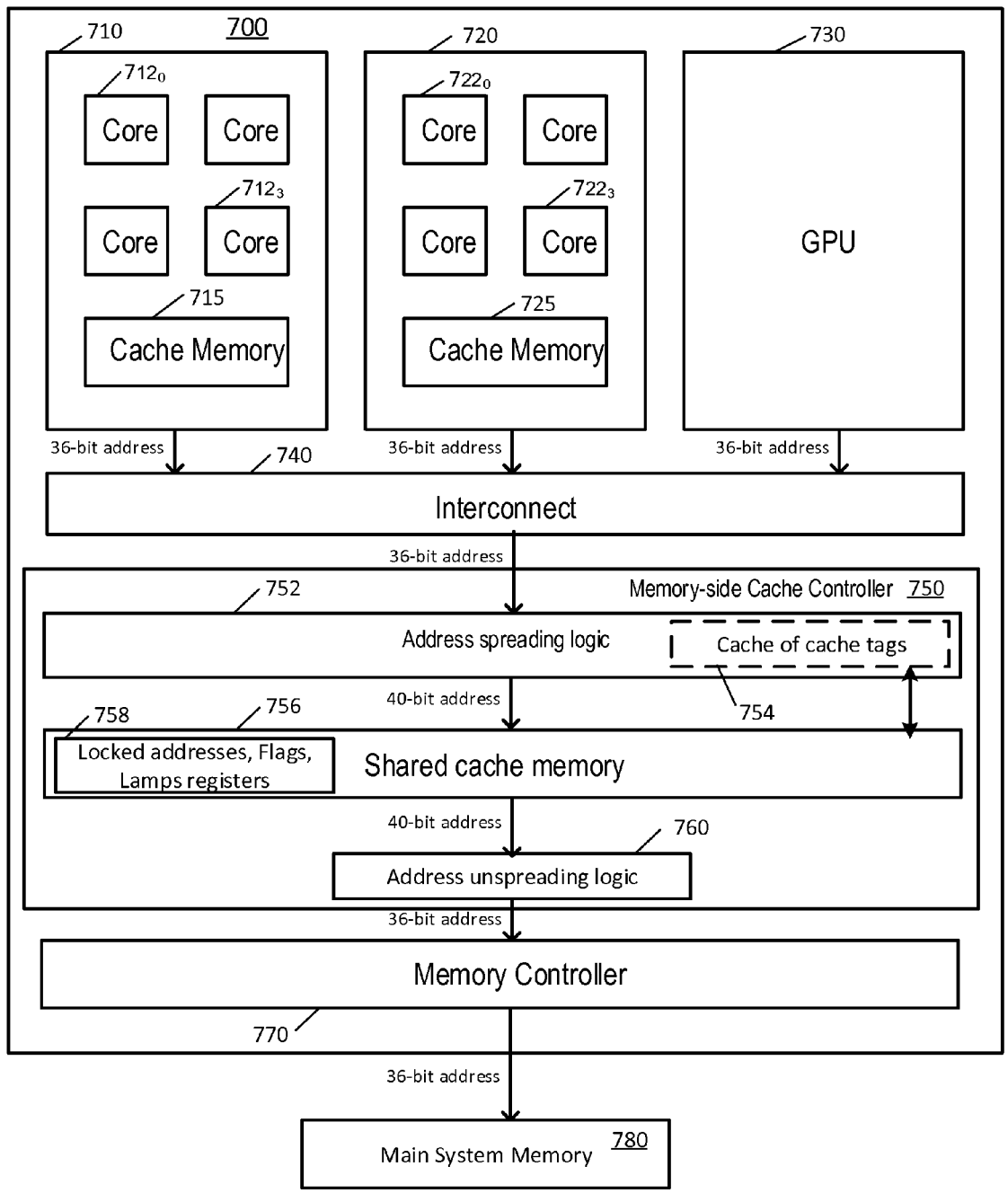
FIG. 7 is a block diagram of a representative system on a chip (SoC).

Referring now to FIG. 7, shown is a block diagram of a representative system on a chip (SoC). In the embodiment shown, SoC 700 may be a multi-core SoC configured for low power operation to be optimized for incorporation into a smartphone or other low power device such as a tablet computer or other portable computing device. As an example, SoC 700 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 7, SoC 700 includes a first core domain 710 having a plurality of first cores $712_0$-$712_3$. In an example, these cores may be low power cores such as in-order cores. In one embodiment these first cores may be implemented as ARM Cortex A53 cores. In turn, these cores couple to a cache memory 715 of core domain 710. In addition, SoC 700 includes a second core domain 720. In the illustration of FIG. 7, second core domain 720 has a plurality of second cores $722_0$-$722_3$. In an example, these cores may be higher power-consuming cores than first cores 712. In an embodiment, the second cores may be out-of-order cores, which may be implemented as ARM Cortex A57 cores. In turn, these cores couple to a cache memory 725 of core domain 720. Note that while the example shown in FIG. 7 includes 4 cores in each domain, understand that more or fewer cores may be present in a given domain in other examples.

With further reference to FIG. 7, a graphics domain 730 also is provided, which may include one or more graphics processing units (GPUs) configured to independently execute graphics workloads, e.g., provided by one or more cores of core domains 710 and 720. As an example, GPU domain 730 may be used to provide display support for a variety of screen sizes, in addition to providing graphics and display rendering operations.

As seen, the various domains couple to an interconnect 740, which in an embodiment may be a cache coherent interconnect fabric that in turn couples to an integrated cache memory controller 750. The cache memory controller 750 may include a shared cache memory 756, such as an L3 cache, in some examples. The shared cache memory 756 may include cache controller registers 758 that may store flag indicators, lamp indicators, indications of which original PPAs are locked, and other information, in accordance with embodiments of the present invention. The cache controller 750 may also include address spreading logic 752 that may include a cache of cache tags 754 in accordance with embodiments of the present invention, and may include address unspreading logic 760. The address spreading logic 752 may input a 36 bit address and may provide, to the shared cache memory 756, a 40 bit address in accordance with embodiments of the present invention. The address unspreading logic 760 may input 40-bit addresses to a memory controller 770 that may output 36-bit addresses to a memory controller 770 that is to couple to a main system memory 780. In an embodiment, memory controller 770 may be a direct memory controller to provide for multiple channels of communication with an off-chip memory, such as multiple channels of a DRAM (not shown for ease of illustration in FIG. 7).

In different examples, the number of the core domains may vary. For example, for a low power SoC suitable for incorporation into a mobile computing device, a limited number of core domains such as shown in FIG. 7 may be present. Still further, in such low power SoCs, core domain 720 including higher power cores may have fewer numbers of such cores. For example, in one implementation two cores 722 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Additional embodiments are described below.

In a first embodiment, a processor includes at least one core, a cache memory, and a cache controller. Responsive to a request to store an address of a data entry into the cache memory, the cache controller is to determine whether an initial cache set corresponding to the address has available capacity to store the address in the cache memory. Responsive to unavailability of capacity in the initial cache set, the cache controller is to generate a first alternate address associated with the data entry and to determine whether a first cache set corresponding to the first alternate address has available capacity to store the alternate address and if so to store the first alternate address in the first cache set.

A second embodiment includes elements of the 1$^{st}$ embodiment. Additionally, responsive to unavailability of capacity in the first cache set, the cache controller is to generate at least one additional alternate address and to determine whether a corresponding cache set has available capacity to store the at least one additional alternate address, and if so to store the at least one additional alternate address in the corresponding cache set.

A 3$^{rd}$ embodiment includes elements of the 2$^{nd}$ embodiment. Additionally, when each corresponding cache set has no capacity to store a corresponding one of the at least one additional alternate address, the cache controller is to indicate a failure associated with storage of the address in the cache memory.

A 4$^{th}$ embodiment includes elements of the first embodiment. Additionally, the cache controller includes address generation logic. Responsive to a request to access the data entry and to an unsuccessful attempt to locate the address in the cache memory, the address generation logic is to generate at least one alternate address including the first alternate address, where each alternate address is to be generated based at least in part on the address.

A 5$^{th}$ embodiment includes elements of the 4$^{th}$ embodiment. Additionally, the address generation logic is to generate the at least one alternate address by application of an operation on a first operand that includes a portion of the address and a second operand that includes a defined integer, and replacement of the portion of the address by a resultant of the operation.

A 6$^{th}$ embodiment includes elements of the 5$^{th}$ embodiment. Further, application of the operation on the first operand and the second operand produces a distinct alternate address for each value of the defined integer.

A 7$^{th}$ embodiment includes elements of the 6$^{th}$ embodiment, where the operation is an XOR operation.

An 8$^{th}$ embodiment includes elements of the 1$^{st}$ embodiment. Further, the cache controller includes data access logic that, responsive to a request to access the data entry, is to determine whether the address is stored in the cache memory at the initial cache set and if not, to determine whether an alternate address is stored at a corresponding cache set, and if so, to access the data entry via the one of the at least one alternate address.

A 9$^{th}$ embodiment includes elements of the 1$^{st}$ embodiment, and further includes flag storage to store a flag indicator associated with the initial cache group responsive to generation of the first alternate address.

A 10$^{th}$ embodiment includes elements of the 9$^{th}$ embodiment. Further, responsive to a request to access the data entry the cache controller is to determine whether the address is stored in the initial cache set and if not, to determine whether the flag register includes the flag indicator corresponding to the initial cache set and if not, to indicate a cache miss.

An 11$^{th}$ embodiment includes elements of any one of the 1$^{st}$ to the 10$^{th}$ embodiments, and further includes lamp storage. Upon storage of any alternate address including the first alternate address, the cache controller is to store into the lamp storage a corresponding lamp indicator associated with the corresponding cache set into which the alternate address is stored.

A 12$^{th}$ embodiment is an apparatus that includes a cache memory and a cache controller. The cache controller includes address generation logic. Responsive to a request to access a data entry in the cache memory, the cache controller is to determine whether a native address associated with the data entry is stored in an initial cache set of the cache memory, and responsive to a failure to locate the native address in the cache memory, the address generation logic is to generate at least one alternate address associated with the native address and the cache controller is to determine whether the at least one alternate address is stored in a corresponding cache set, and if so to access the data entry via the at least one alternate address.

A 13$^{th}$ embodiment includes elements of the 12$^{th}$ embodiment, and further includes a flag storage that includes an initial flag that when asserted is to indicate that storage of a first alternate address has been attempted responsive to a failure to store the native address. Responsive to the failure to locate the native address and prior to generation of the at least one alternate address, the cache controller is to determine whether the initial flag register includes the asserted initial flag and if not, to report a cache miss.

A 14$^{th}$ embodiment includes elements of the 12$^{th}$ embodiment, and further includes a lamp storage. Determination by the cache controller of whether one of the at least one alternate address is stored in the cache memory includes, for a first alternate address, the cache controller to determine whether a first lamp indicator associated with a first cache set corresponding to the first alternate address is asserted in the lamp register, and if not, to determine that first cache set does not store the first alternate address.

A 15$^{th}$ embodiment includes elements of any one of the 12th to the 14$^{th}$ embodiments, and further includes a cache of cache tags. Responsive to the request to access a data entry in the cache memory and prior to generation of the at least one alternate address, the cache controller is to determine whether a tag portion of the native address and a corresponding integer is stored in the cache of cache tags, and if so to retrieve the integer from the cache of cache tags, generate a first alternate address based on the integer and the native address, and access the data entry via the first alternate address.

A 16$^{th}$ embodiment includes elements of the 15$^{th}$ embodiment. The first alternate address is to be determined at least in part by application of an XOR operation to the integer as a first operand and a portion of the native address as a second operand, and replacement of the portion of the native address by a result of the XOR operation.

A 17$^{th}$ embodiment is a machine-readable medium having stored thereon data, which if used by at least one machine, causes the at least one machine to fabricate at least one integrated circuit to perform a method that includes determining whether an initial cache set of a cache has availability to store a native address of a data entry, the initial cache set associated with the native address. The method further includes, responsive to determining that the initial cache set is unavailable to store the native address, generating at least one alternate address that aliases to the native address, and determining whether a corresponding cache set of the at least one alternate address has availability to store the at least one alternate address and if so, storing the at least one alternate address in the corresponding cache set.

An 18$^{th}$ embodiment includes elements of the 17$^{th}$ embodiment. The instructions are further for storing, in a flag storage, a flag indicator associated with the initial cache set responsive to generating the at least one alternate address.

A 19$^{th}$ embodiment includes elements of the 18$^{th}$ embodiment. The instructions are further for responsive to a request to access the data entry, determining whether the native address is stored in the initial cache set, and if not, determining whether the flag indicator is stored in the flag register and if not, responding to the request to access the data entry with an indication of a cache miss.

A 20th embodiment includes elements of the 17th embodiment. The instructions are further for, responsive to a request to access the data entry, determining whether the native address is stored in the initial cache set and if not, generating at least one of the alternate addresses based on the native address and determining whether one of the at least one alternate addresses is stored in a corresponding cache set of the cache, and if so, accessing the data via the one of the at least one alternate address.

A 21st embodiment is a method that includes determining, by a cache controller coupled to a cache memory, whether an initial cache set that corresponds to an address associated with a data entry has available capacity to store the address responsive to a request to store the data entry in the cache memory, the initial cache set within the cache memory. The method further includes generating, by the cache controller, a first alternate address associated with the data entry responsive to unavailability of capacity in the initial cache set. Additionally, the method includes determining by the cache controller, whether a first cache set corresponding to the first alternate address has available capacity to store the alternate address and if so, storing the first alternate address in the first cache set of the cache memory.

A 22nd embodiment includes elements of the 21st embodiment. The method further includes, responsive to generating the at least one alternate address, storing, in a flag storage, a flag indicator associated with the initial cache set.

A 23rd embodiment includes elements of the 22nd embodiment. The method further includes responsive to a request to access the data entry, determining whether the native address stored is in the initial cache set, and if not, determining whether the flag indicator is stored in the flag register and if not, responding to the request to access the data entry with an indication of a cache miss.

A 24th embodiment includes elements of the 21st embodiment, and further includes, responsive to a request to access the data entry, determining a whether the native address is stored in the initial cache set and if not, generating at least one of the alternate addresses based on the native address and determining whether one of the at least one alternate addresses is stored in a corresponding cache set of the cache, and if so, accessing the data via the one of the at least one alternate address.

A 25th embodiment is an apparatus to perform the method of any one of the 21st to the 24th embodiments.

A 26th embodiment is an apparatus that includes means for performing the method of any one of the 21st to the 24th embodiments.

A 27th embodiment is an apparatus that includes cache controller means for determining whether an initial cache set that corresponds to an address associated with a data entry has available capacity to store the address responsive to a request to store the data entry in the cache memory, the initial cache set within the cache memory. The apparatus further includes means for generating a first alternate address associated with the data entry responsive to unavailability of capacity in the initial cache set. Additionally, the apparatus includes means for determining whether a first cache set corresponding to the first alternate address has available capacity to store the alternate address and if so, storing the first alternate address in the first cache set of the cache memory.

A 28th embodiment includes elements of the 27th embodiment, and further includes means for storing, in a flag storage, a flag indicator associated with the initial cache set responsive to generating the at least one alternate address.

A 29th embodiment includes elements of the 27th embodiment, and further includes means for determining whether the native address stored is in the initial cache set responsive to a request to access the data entry, and if not, for determining whether the flag indicator is stored in the flag register and if not, for responding to the request to access the data entry with an indication of a cache miss.

A 30th embodiment includes elements of any one of the 27th to the 29th embodiments and further includes, means for determining, responsive to a request to access the data entry, whether the native address is stored in the initial cache set, means for generating at least one of the alternate addresses based on the native address if the native address is not stored in the initial cache set, means for determining whether one of the at least one alternate addresses is stored in a corresponding cache set of the cache, and means for accessing the data via the one of the at least one alternate address when one of the at least one alternate addresses is stored in the corresponding cache set of the cache.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   at least one core;
   a cache memory; and
   a cache controller, wherein responsive to a request to store an address of a data entry into the cache memory, the cache controller is to determine whether an initial cache set corresponding to the address has available capacity to store the address in the cache memory, and responsive to unavailability of capacity in the initial cache set, the cache controller is to generate a first alternate address associated with the data entry and to determine whether a first cache set corresponding to the first alternate address has available capacity to store the alternate address and if so to store the first alternate address in the first cache set.

2. The processor of claim 1, wherein responsive to unavailability of capacity in the first cache set, the cache controller is to generate at least one additional alternate address and to determine whether a corresponding cache set has available capacity to store the at least one additional alternate address, and if so to store the at least one additional alternate address in the corresponding cache set.

3. The processor of claim 2, wherein when each corresponding cache set has no capacity to store a corresponding one of the at least one additional alternate address, the cache controller is to indicate a failure associated with storage of the address in the cache memory.

4. The processor of claim 1, wherein the cache controller includes address generation logic, wherein responsive to a request to access the data entry and to an unsuccessful attempt to locate the address in the cache memory, the address generation logic is to generate at least one alternate address including the first alternate address, wherein each alternate address is to be generated based at least in part on the address.

5. The processor of claim 4, wherein the address generation logic is to generate the at least one alternate address by application of an operation on a first operand that comprises a portion of the address and a second operand that comprises a defined integer, and replacement of the portion of the address by a resultant of the operation.

6. The processor of claim 5, wherein application of the operation on the first operand and the second operand produces a distinct alternate address for each value of the defined integer.

7. The processor of claim 6, wherein the operation is an XOR operation.

8. The processor of claim 1, wherein the cache controller includes data access logic that, responsive to a request to access the data entry, is to determine whether the address is stored in the cache memory at the initial cache set and if not, to determine whether an alternate address is stored at a corresponding cache set, and if so, to access the data entry via the one of the at least one alternate address.

9. The processor of claim 1, further comprising flag storage to store a flag indicator associated with the initial cache group responsive to generation of the first alternate address.

10. The processor of claim 9, wherein responsive to a request to access the data entry the cache controller is to determine whether the address is stored in the initial cache set and if not, to determine whether the flag storage includes the flag indicator corresponding to the initial cache set and if not, to indicate a cache miss.

11. The processor of claim 1, further comprising lamp storage, wherein upon storage of any alternate address including the first alternate address, the cache controller is to store into the lamp storage a corresponding lamp indicator associated with the corresponding cache set into which the alternate address is stored.

12. An apparatus comprising:
a cache memory; and
a cache controller including address generation logic, wherein responsive to a request to access a data entry in the cache memory, the cache controller is to determine whether a native address associated with the data entry is stored in an initial cache set of the cache memory, and responsive to a failure to locate the native address in the cache memory, the address generation logic is to generate at least one alternate address associated with the native address and the cache controller is to determine whether the at least one alternate address is stored in a corresponding cache set, and if so to access the data entry via the at least one alternate address.

13. The apparatus of claim 12, further including a flag storage including an initial flag that when asserted is to indicate that storage of a first alternate address has been attempted responsive to a failure to store the native address, wherein responsive to the failure to locate the native address and prior to generation of the at least one alternate address, the cache controller is to determine whether the flag storage includes the asserted initial flag and if not, to report a cache miss.

14. The apparatus of claim 12, further including a lamp storage, wherein determination by the cache controller of whether one of the at least one alternate address is stored in the cache memory includes, for a first alternate address, the cache controller to determine whether a first lamp indicator associated with a first cache set corresponding to the first alternate address is asserted in the lamp register, and if not, to determine that first cache set does not store the first alternate address.

15. The apparatus of claim 12, further comprising a cache of cache tags, wherein responsive to the request to access a data entry in the cache memory and prior to generation of the at least one alternate address, the cache controller is to determine whether a tag portion of the native address and a corresponding integer is stored in the cache of cache tags, and if so to retrieve the integer from the cache of cache tags, generate a first alternate address based on the integer and the native address, and access the data entry via the first alternate address.

16. The apparatus of claim 15, wherein the first alternate address is to be determined at least in part by application of an XOR operation to the integer as a first operand and a portion of the native address as a second operand, and replacement of the portion of the native address by a result of the XOR operation.

17. A machine-readable medium having stored thereon data, which if used by at least one machine, causes the at least one machine to fabricate at least one integrated circuit to perform a method comprising:
determining whether an initial cache set of a cache has availability to store a native address of a data entry, the initial cache set associated with the native address;
responsive to determining that the initial cache set is unavailable to store the native address, formulating at least one alternate address associated with the native address, and determining whether a corresponding cache set of the at least one alternate address has availability to store the at least one alternate address and if so, storing the at least one alternate address in the corresponding cache set.

18. The storage medium of claim 17, wherein the instructions are further for storing, in a flag storage, a flag indicator associated with the initial cache set responsive to formulating the at least one alternate address.

19. The storage medium of claim 18, wherein the instructions are further for responsive to a request to access the data entry, determining whether the native address stored in the initial cache set, and if not, determining whether the flag indicator is stored in the flag storage and if not, responding to the request to access the data entry with an indication of a cache miss.

20. The storage medium of claim 17, wherein the instructions are further for, responsive to a request to access the data entry, determining whether the native address is stored in the initial cache set and if not, formulating at least one of the alternate addresses based on the native address and determining whether one of the at least one alternate addresses is stored in a corresponding cache set of the cache, and if so, accessing the data via the one of the at least one alternate address.

\* \* \* \* \*